United States Patent
Franchi et al.

(10) Patent No.: US 10,430,177 B2
(45) Date of Patent: Oct. 1, 2019

(54) METHOD FOR UPDATING A PACKAGE

(71) Applicant: GEMALTO SA, Meudon (FR)

(72) Inventors: Christophe Franchi, Mimet (FR); François-Xavier Marseille, Marly le Roi (FR)

(73) Assignee: THALES DIS FRANCE SA, Meudon (FR)

( * ) Notice: Subject to any disclaimer, the term of this patent is extended or adjusted under 35 U.S.C. 154(b) by 0 days.

(21) Appl. No.: 15/767,395

(22) PCT Filed: Sep. 27, 2016

(86) PCT No.: PCT/EP2016/072991
§ 371 (c)(1),
(2) Date: Apr. 11, 2018

(87) PCT Pub. No.: WO2017/067760
PCT Pub. Date: Apr. 27, 2017

(65) Prior Publication Data
US 2018/0300120 A1  Oct. 18, 2018

(30) Foreign Application Priority Data
Oct. 20, 2015 (EP) ................................. 15306680

(51) Int. Cl.
*G06F 9/445* (2018.01)
*G06F 8/65* (2018.01)
(Continued)

(52) U.S. Cl.
CPC ............ *G06F 8/65* (2013.01); *G06F 9/45558* (2013.01); *H04W 4/50* (2018.02); *H04W 4/60* (2018.02);
(Continued)

(58) Field of Classification Search
CPC ....... G06F 8/65; G06F 11/1433; G06F 21/572
See application file for complete search history.

(56) References Cited

U.S. PATENT DOCUMENTS

| 2009/0144718 A1* | 6/2009 | Boggs | G06F 8/65 717/170 |
| 2011/0072421 A1* | 3/2011 | Parry | G06F 8/65 717/168 |

(Continued)

FOREIGN PATENT DOCUMENTS

| EP | 2 660 721 A1 | 11/2013 |
| EP | 2 827 275 A1 | 1/2015 |

(Continued)

OTHER PUBLICATIONS

International Search Report (PCT/ISA/210) dated Dec. 8, 2016, by the European Patent Office as the International Searching Authority for International Application No. PCT/EP2016/072991.
(Continued)

*Primary Examiner* — Hanh Thi-Minh Bui
(74) *Attorney, Agent, or Firm* — Buchanan Ingersoll & Rooney PC

(57) ABSTRACT

The invention is a method of updating a first executable code comprised in a first package in a secure element, a class instance being instantiated from said first package and comprising instance data. The method comprises the following steps:
 loading in the secure element an upgrade file comprising a second executable code and creating a second package from said upgrade file,
 changing said first executable code for said second executable code by replacing a reference to the first package by a reference to the second package in a package list stored in the secure element, while leaving the class instance alive and said instance data unchanged.

8 Claims, 3 Drawing Sheets

(51) Int. Cl.
*H04W 4/50* (2018.01)
*H04W 4/60* (2018.01)
*H04W 12/08* (2009.01)
*G06F 9/455* (2018.01)
*H04W 12/00* (2009.01)

(52) U.S. Cl.
CPC ....... *H04W 12/0023* (2019.01); *H04W 12/08* (2013.01)

(56) References Cited

U.S. PATENT DOCUMENTS

2015/0193224 A1* 7/2015 Ziat .................. G06F 8/65
  717/172
2018/0232226 A1* 8/2018 Marino ............... G06F 21/56

FOREIGN PATENT DOCUMENTS

EP     2 887 213 A1    6/2015
EP     3086254 A1 * 10/2016 ............. G06F 21/51

OTHER PUBLICATIONS

Written Opinion (PCT/ISA/237; dated Dec. 8, 2016, by the European Patent Office as the International Searching Authority for International Application No. PCT/EP2016/072991.

* cited by examiner

METHOD FOR UPDATING A PACKAGE

FIELD OF THE INVENTION

The present invention relates to methods of updating a package. It relates particularly to methods of updating executable code comprised in a package stored in a secure element.

BACKGROUND OF THE INVENTION

Secure elements are small devices comprising a memory, a microprocessor and an operating system for computing treatments. Such secure elements may comprise a plurality of memories of different types, like non-volatile memory and volatile memory. They are called "secure" because they are able to control the access to the data they contain and to authorize or not the use of data by other machines. The secure elements may also provide computation services based on cryptographic components. In general, secure elements have limited computing resources and limited memory resources and they are intended to be connected to a host machine which provides them with electric power. Secure elements may be removable or fixed to a host machine. For example, smart cards are a kind of secure elements.

A secure element may contain applications and their associated applicative data which encompass user data, file systems and secret key. Such an application may be developed as a package or a set of packages which is stored into the secure element. One or several instances of the package(s) are then created as needed. Each instance owns, handles and store its own instance data.

Secure elements may be accessed by a remote server via a wireless channel or through a wired network, like Internet for instance. For example, secure elements which are intended to be used in Telecom domain or Machine-To-Machine (M2M) domain are able to manage an OTA (Over-The-Air) channel. These secure elements may also be accessed through the HyperText Transfer Protocol, usually called HTTP or HTTPS for the secure mode. Thus, a distant server can remotely manage the content of a secure element like an UICC (Universal Integrated Circuit Card) through a dedicated communication session using a specific protocol. For example, the server may use the RAM (Remote Applet Management) mechanism as defined by GlobalPlatform® v 2.2 standard-Amendment B "RAM over HTTP" or the OMA-DM (Open Mobile Alliance-Device Management) protocol as defined by OMA-TS-DM V1.2.1 standard.

A remote server can send a new version or an upgrade of a package. In this case, the instances linked to the previous package are deleted and a temporary back up of their instance data is stored in the remote server. Then the new version of the package is installed, new instances are created and populated with instance data retrieved from the back up area. Such a scheme is a painful task and may lead to data loss. Moreover, the sending of backup data to the server requests a part of bandwidth which may be important due to the huge number of secure elements to be upgraded.

There is a need for allowing an enhanced updating of package allowing to keep current instance data available for instances instantiated from a new package in a secure element.

SUMMARY OF THE INVENTION

An object of the invention is to solve the above mentioned technical problem.

The object of the present invention is a method of updating a first executable code comprised in a first package in a secure element. A class instance is instantiated from said first package and comprises an instance data. The method comprises the following steps:
loading in the secure element an upgrade file comprising a second executable code and creating a second package from said upgrade file,
changing said first executable code for said second executable code by replacing a reference to the first package by a reference to the second package in a package list stored in the secure element, while leaving the class instance alive and said instance data unchanged.

Advantageously, said first package may be disabled after the changing step.

Advantageously, said first package may be deleted after the changing step.

Advantageously, the upgrade file may comprise a static field and the secure element may ignore said static field.

Advantageously, the first executable code may comprise a first entry of a class, the class instance may comprise a class reference to said first entry in said first package. The class reference may be separate from the instance data and may be kept unchanged. The second executable code may comprise a second entry of said class and said second entry may be reachable in said second package through the class reference.

Advantageously, the class instance may comprise a package reference to the first package, the package reference may be separate from the instance data and may be kept unchanged, and the second package may be reachable through the package reference.

Another object of the invention is secure element comprising a first package including a first executable code. The secure element comprises a class instance instantiated from said first package. The class instance comprises an instance data. The secure element comprises an agent adapted to load an upgrade file comprising a second executable code and to create a second package from said upgrade file. The secure element includes a package list comprising a reference to the first package. The agent is adapted to change said first executable code for said second executable code by replacing the reference to the first package by a reference to the second package in the package list, while leaving the class instance alive and the instance data unchanged.

Advantageously, the agent may be configured to disable said first package after the reference to the first package has been replaced by the reference to the second package in the package list.

Advantageously, the upgrade file may comprise a static field and the secure element may be configured to ignore said static field.

Advantageously, the secure element may comprise a virtual machine compliant with JavaCard version 2.2 and both said first and second executable codes may be designed to be run by the virtual machine.

BRIEF DESCRIPTION OF THE DRAWINGS

Other characteristics and advantages of the present invention will emerge more clearly from a reading of the following description of a number of preferred embodiments of the invention with reference to the corresponding accompanying drawings in which.

DETAILED DESCRIPTION OF THE PREFERRED EMBODIMENTS

The invention may apply to any types of secure element intended to embed applications which may be upgraded when deployed on the field. Such secure elements may be coupled to a host machine like a smartphone, a smart watch, a vehicle, a meter, a slot machine, a TY or a computer.

In the present description, the word instance means an instance of a software application. The invention applies to instances as defined in Java® domain but also to other object-oriented programming languages.

The invention relies on the fact of keeping existing instances of class (i.e. without deleting) and of recreating links between the new package and these instances.

An advantage of the invention is to avoid the sending of instance data outside the secure element when an upgrade of package occurs. Since the instance data remains in the secure element, the invention offers the advantage of avoiding the attacks during the transport of instance data over the network. This increases the security of the instance data.

Figure 1:
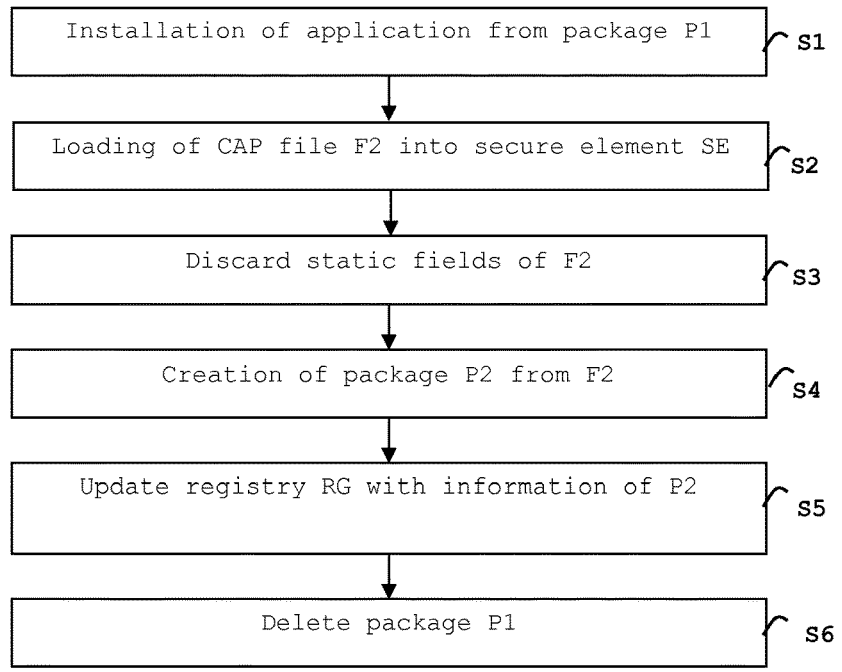
FIG. 1 shows a first exemplary flow diagram of a replacement of a package by an upgraded package according to the invention.

FIG. 1 shows an example of a flow diagram for replacing a package with an upgraded package according to the invention.

The initial package P1 has been previously installed in the secure element. It includes an execution code EC1 which is intended to be run by a virtual machine embedded in the secure element.

At step S1, an application is installed from the package P1. In other words, an application instance is created by instantiating the package P1. Thus, an application instance is created from the package P1 in the secure element SE.

Figures 3, 4:
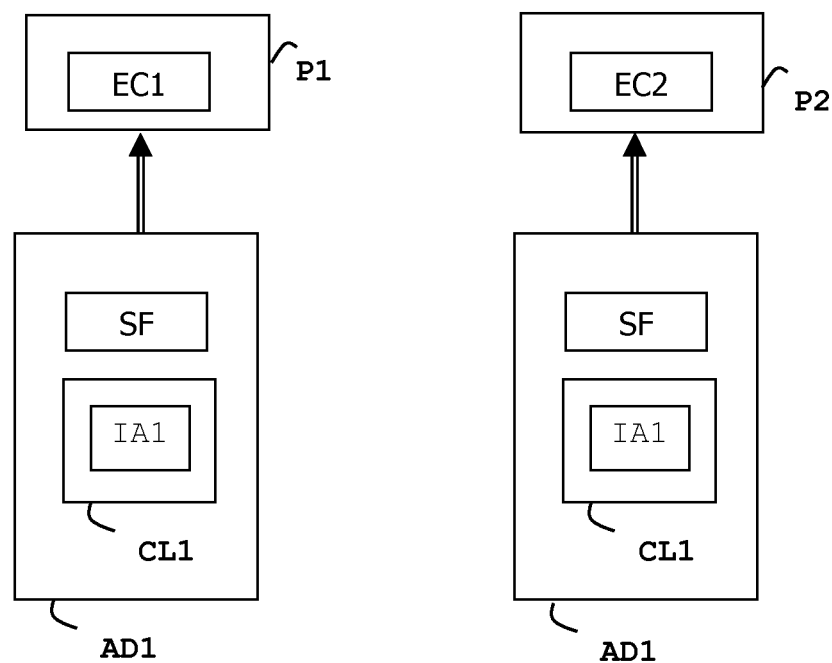
FIG. 3 depicts schematically an example of link between data of an application and an initial package.
FIG. 4 depicts schematically an example of link between data of an application and an upgraded package according to the invention.

FIG. 3 illustrates an example of link between data AD1 of the application and the initial package P1.

The data AD1 of the application is stored in the secure element and includes a class instance CL1 and a set SF of static fields. The class instance CL1 comprises instance data IA1. The set SF of static fields is shown as a part of the application data AD1. In fact, this set SF of static fields is implemented as a part of the package P1 and is shared by all instances created from this package. The instance data IA1 may be updated during execution of the application and comprises values which reflect usage of the application. For example, the instance data IA1 may comprise a transaction counter, a purse value and both the amount and date of the last transaction. The application data AD1 refers to the package P1. Thus data AD1 are manipulated by the execution code EC1 when the application is running.

Although the application data AD1 comprises a single class instance in this example, the application data AD1 may comprise several class instances.

By reference to the flow detailed at FIG. 1, the behavior of the application must be changed due to a need of bug fixing or feature upgrading for example.

At step S2, an upgrade file F2 is uploaded in the secure element SE. For instance, the upgrade file F2 may be a CAP file if the secure element embeds a JavaCard virtual machine (JVM). For example, the JVM may be compliant with JavaCard specifications version 2.2 or upper.

At step S3, the secure element discards the static fields comprised in the upgrade file F2. For example, the upgrade file F2 may be a CAP file comprising static fields which contain information required to create and initialize an image of all the static fields defined in the package. According to the invention, these static fields are ignored.

It is to be noted that the secure element does nothing if the static field section of the upgrade file F2 is empty.

At seep S4, the secure element generates a package P2 from the upgrade file F2. The package P2 includes an execution code EC2 which is intended to replace execution code EC1 of the initial package P1.

Although steps S3 and S4 have been described as two distinct steps, they may be combined in a unique step.

At step S5, the secure element updates a package list RG (also named registry) with the information of package P2. More precisely, the secure element updates a package list RG which is separate from both the package P2, the set SF of static fields and the class instance CL1. For instance, the secure element may update the value of a pointer to the package P2.

FIG. 4 illustrates an example of link between data AD1 of the application and the new package P2.

During the package replacement according to the invention, the instance data IA1 are never modified. Preferably, the application data AD1 has not been modified and refers to the new package P2 through the registry RG.

By reference to the flow detailed at FIG. 1, the secure element can now delete the package P1 to save memory space at step S6. Alternatively, the secure element can disable the package P1 and keep the package P1 in the non-volatile memory for history reasons or to be able to come back to the initial state for example.

Figure 2:
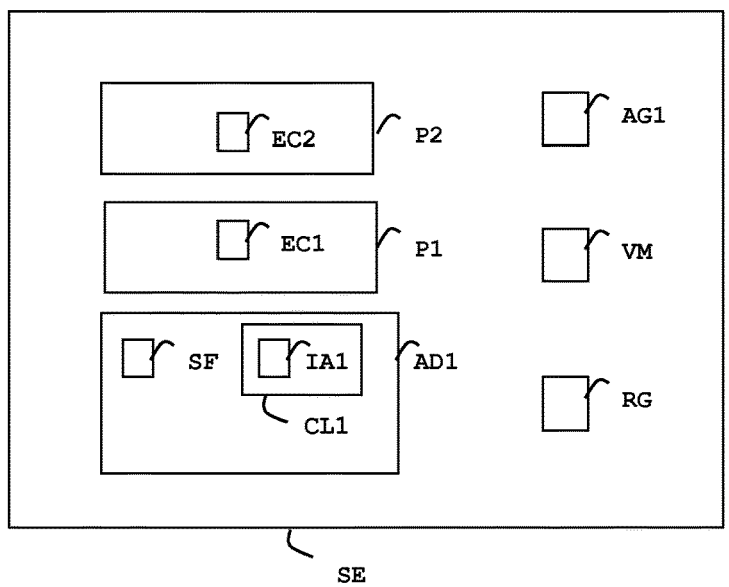
FIG. 2 shows a diagram of a secure element according to an example of the invention.

FIG. 2 shows an example a diagram of a secure element according to an example of the invention.

The secure element SE includes two packages P1 and P2 of an application. The package P2 is assumed to be an upgraded version of the package P1. Package P1 contains the execution code EC1 and package P2 contains the execution code EC2. The secure element SE contains an instance of an application created from the package P1. This application instance is implemented through the combination of the execution code EC1 and application data AD1. The application data AD1 comprises an instance class CL1 and a set SF of static fields. The instance class CL1 comprises instance data IA1 which are applicative data.

In this example, the secure element is a smart card comprising a communication interface (not shown) configured to exchange data with the outside according to ISO7816 standards.

The secure element SE comprises a JavaCard virtual machine VM, a package list RG and a software agent AG1. The agent AG1 is configured to load an upgrade file comprising a new executable code and to create a new package from this upgrade file.

The package list RG comprises a reference to the current (i.e. active) package. The agent AG1 is configured to change an executable code for a new executable code by replacing the reference to the current package by a reference to the new package in the package list RG, while leaving the class instance alive and the instance data unchanged.

In the example of FIG. 2, the current package is the package P1 and the package P2 has just been created.

Figure 5:
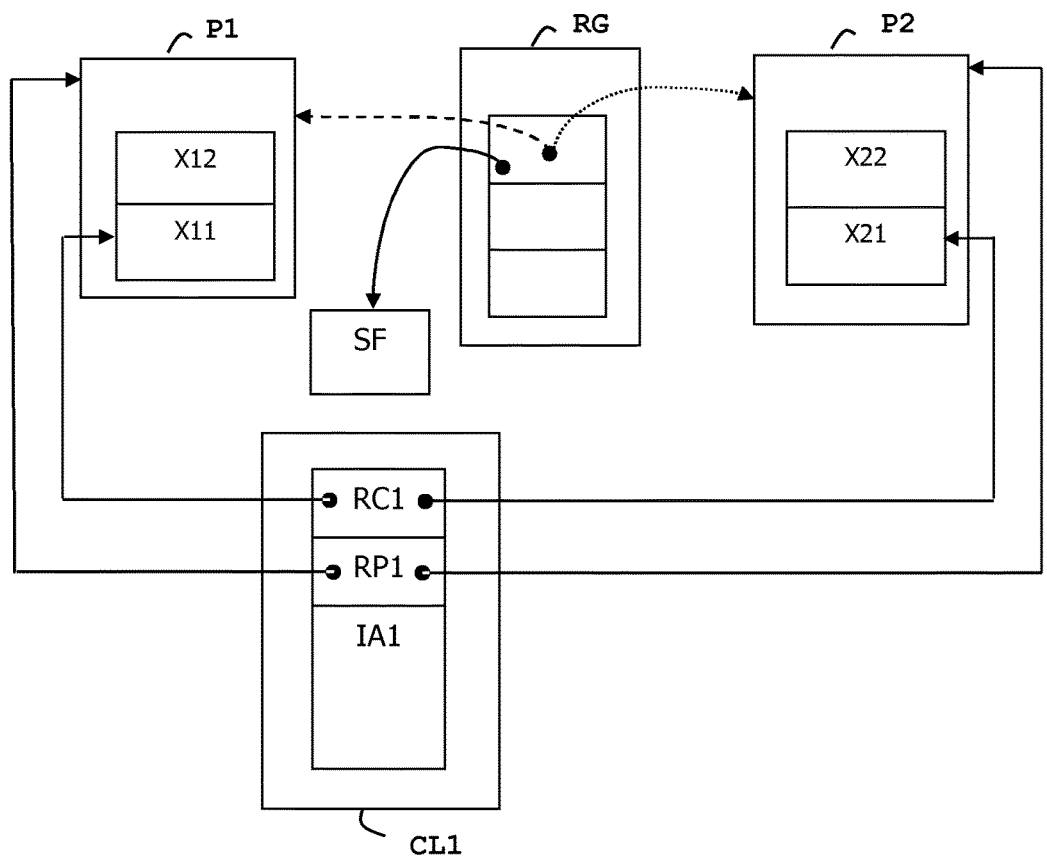
FIG. 5 depicts an example of package replacement according to the invention.

FIG. 5 shows an example of package replacement according to the invention.

As illustrated at FIG. 2, the current package is the package P1 and the package P2 has been created and is not activated in the secure element SE.

The package list RG comprises a reference to the set SF of static fields and a reference to the active (i.e. current) package.

The package P1 comprises an entry X11 for a first class and an entry X12 for a second class that belong to the execution code EC1. Preferably, the entry X11 is located at a predefined offset in the execution code EC1. The class instance CL1 is assumed to be an instance of the first class. The class instance CL1 comprises an instance data IA1, a reference RP1 to the current package (i.e. package P1) and a reference RC1 to the class entry X11. Preferably, the references RP1 and RC1 belong to the header of class instance CL1 while the instance data IA1 belong to the body of the class instance CL1.

The package P2 comprises an entry X21 for the first class and an entry X22 for the second class. In other words, the execution code EC2 of the package P2 comprises two entries X21 and X22 corresponding to the new code of the two classes. Preferably, the entry X21 is located in the execution code EC2 at the same predefined offset as entry X11 in the execution code EC1. Thus, the reference RC1 to the class entry X11 may be used as it is (i.e. without modification) to access the class entry X21.

Preferably, the reference RP1 points at the reference to the active package in the package list RG so that the reference RP1 may be used as it is (i.e. without modification) to access the new package after the package replacement.

The functional package replacement is then performed by updating the reference to the active package in the package list RG. At FIG. 5, the previous link to the package P1 (shown in dashed line) is replaced with a new link to the package P2 (shown in dotted line).

According to the invention the instance data IA1 remains unchanged (i.e. values of the instance data IA1 are not modified). Thus neither the instance data itself nor its metadata/header is modified because the package list RG is separate from the applicative data. Since there is no need to update the instance data IA1, the instance data can stay in their original location in a non-volatile memory of the SE. (no need to write the instance data with a new value in the non-volatile memory.)

Alternatively, one of the references RP1 & RC1 (or both) can be updated during the functional package replacement.

In all examples, the invention allows to keep unchanged the instance data IA1 of the class instance CL1.

Thanks to the invention it is possible to easily and smoothly manage the migration of existing instances, by keeping applicative data already present inside the secure element instances.

The invention is not limited to the described embodiments or examples. In particular, the package list RG may be implemented through any form allowing to contain a list of the packages like a tab, a tree, a registry, a file or a chaining list.

It is to be noted that the invention applies to package update even if an application is not instantiated from the package. For example, the invention allows to replace an API (Application Programming Interface) package.

The invention claimed is:

1. A computer-implemented method for updating a first executable code comprised in a first package in a secure element, a class instance being instantiated from said first package and comprising instance data, wherein the secure element includes a package list comprising a reference to an active package, said active package being said first package, and said package list being separate from said class instance, wherein said class instance comprises a package reference pointing at said reference to the active package in said package list, wherein said method comprises the following steps:
loading in the secure element an upgrade file comprising a second executable code and creating a second package comprising said second executable code from said upgrade file, and
changing said first executable code for said second executable code by updating said reference to the active package in said package list by replacing a reference to the first package by a reference to the second package, while leaving the class instance alive and keeping the class instance unchanged, said class instance and said instance data remaining linked to the active package,
wherein the first executable code comprises a first entry of a class, wherein said class instance comprises a class reference to said first entry in said first package, wherein said class reference is separate from the instance data and is kept unchanged, wherein the second executable code comprises a second entry of said class and wherein said second entry is reachable in said second package through the class reference.

2. A method according to claim 1, wherein said first package is disabled after the changing step.

3. A method according to claim 1, wherein said first package is deleted after the changing step.

4. A method according to claim 1, wherein the upgrade file comprises a static field and wherein the secure element ignores said static field.

5. A secure element comprising a processor and a first package including a first executable code, said secure element comprising a class instance instantiated from said first package and comprising instance data,
wherein said secure element comprises an agent including first instructions that, when executed by the processor, cause said agent to load an upgrade file comprising a second executable code and to create a second package from said upgrade file, said second package comprising said second executable code,
wherein said secure element includes a package list comprising a reference to an active package, said active package being said first package, said package list being separate from said class instance, wherein said class instance comprises a package reference pointing at said reference to the active package in said package list, and
wherein the agent includes second instructions that, when executed by the processor, cause said agent to change said first executable code for said second executable code by updating said reference to the active package in said package list by replacing the reference to the first package by a reference to the second package, while leaving the class instance alive and keeping the class instance unchanged,
wherein the first executable code comprises a first entry of a class, wherein said class instance comprises a class reference to said first entry in said first package, wherein said class reference is separate from the instance data and is kept unchanged, wherein the second executable code comprises a second entry of said class and wherein said second entry is reachable in said second package through the class reference.

6. A secure element according to claim 5 wherein the agent is configured to disable said first package after the reference to the first package has been replaced by the reference to the second package in the package list.

7. A secure element according to claim 5 wherein the upgrade file comprises a static field and wherein the secure element is configured to ignore said static field.

8. A secure element according to claim 5 wherein said secure element comprises a virtual machine compliant with JavaCard version 2.2, and wherein said first and second executable codes are designed to be run by the virtual machine.

\* \* \* \* \*